US010430835B2

(12) United States Patent
Doğruöz et al.

(10) Patent No.: US 10,430,835 B2
(45) Date of Patent: Oct. 1, 2019

(54) METHODS, SYSTEMS, AND MEDIA FOR LANGUAGE IDENTIFICATION OF A MEDIA CONTENT ITEM BASED ON COMMENTS

(71) Applicant: Google LLC, Mountain View, CA (US)

(72) Inventors: Ayşe Seza Doğruöz, Kirklareli (TR); Natalia Ponomareva, Jersey City, NJ (US); Christoph Urs Oehler, Olten (CH); Dimitri Kanevsky, Ossining, NY (US)

(73) Assignee: Google LLC, Mountain View, CA (US)

( * ) Notice: Subject to any disclaimer, the term of this patent is extended or adjusted under 35 U.S.C. 154(b) by 455 days.

(21) Appl. No.: 15/174,668

(22) Filed: Jun. 6, 2016

(65) Prior Publication Data

US 2017/0300976 A1 Oct. 19, 2017

Related U.S. Application Data

(60) Provisional application No. 62/322,685, filed on Apr. 14, 2016.

(51) Int. Cl.
*G06F 16/00* (2019.01)
*G06Q 30/02* (2012.01)
*G06F 17/27* (2006.01)
*G06Q 50/00* (2012.01)

(52) U.S. Cl.
CPC ....... *G06Q 30/0269* (2013.01); *G06F 17/275* (2013.01); *G06Q 30/0241* (2013.01); *G06Q 50/01* (2013.01)

(58) Field of Classification Search
CPC ......... G06F 17/30991; G06F 17/30247; G06F 17/3028; G06F 17/275; G06Q 50/01; G06Q 30/0241; G06Q 30/026
See application file for complete search history.

(56) References Cited

U.S. PATENT DOCUMENTS

| 8,321,463 | B2  | 11/2012 | Cierniak et al. |
| 9,923,860 | B2* | 3/2018  | Krishnaswamy ....... H04L 51/32 |
| 10,037,320 | B2* | 7/2018 | Amin ...................... G06F 17/24 |

(Continued)

OTHER PUBLICATIONS

Filippova et al., Improved Video Categorization from Text Metadata and User Comments, Jul. 24, 2011.*

(Continued)

*Primary Examiner* — Leslie Wong
(74) *Attorney, Agent, or Firm* — Byrne Poh LLP

(57) ABSTRACT

Methods, systems, and media for language identification of a media content item based on comments are provided. In some embodiments, the method includes: obtaining a plurality of comments associated with a media content item; selecting a subset of the plurality of comments based on one or more criteria; assigning, for each comment in the subset of the plurality of comments, a vector of language probabilities, wherein each component of the vector is assigned a language probability that indicates the likelihood that the comment includes content in a language from a plurality of languages; combining the vector of language probabilities for each comment in the subset of the plurality of comments to generate a combined language vector; identifying a language associated with the media content item based on the combined language vector; and performing an action based on the identified language.

19 Claims, 4 Drawing Sheets

(56) References Cited

U.S. PATENT DOCUMENTS

| | | | |
|---|---|---|---|
| 2002/0161747 A1* | 10/2002 | Li | G06F 17/30017 |
| 2005/0071368 A1* | 3/2005 | Kim | G06F 17/30038 |
| 2006/0129909 A1* | 6/2006 | Butt | G11B 20/10 |
| | | | 715/201 |
| 2006/0184357 A1* | 8/2006 | Ramsey | G06F 17/275 |
| | | | 704/9 |
| 2007/0288416 A1 | 12/2007 | Ferguson et al. | |
| 2010/0265397 A1 | 10/2010 | Dasher et al. | |
| 2011/0123015 A1* | 5/2011 | Erhart | G06Q 30/0201 |
| | | | 379/265.02 |
| 2012/0004899 A1* | 1/2012 | Arshi | G06Q 30/02 |
| | | | 704/8 |
| 2013/0317808 A1 | 11/2013 | Kruel et al. | |
| 2014/0157306 A1 | 6/2014 | Deo et al. | |
| 2014/0196082 A1* | 7/2014 | Maruyama | G09G 5/00 |
| | | | 725/32 |
| 2014/0236733 A1* | 8/2014 | Cho | G06Q 30/02 |
| | | | 705/14.66 |
| 2014/0338001 A1* | 11/2014 | Zhang | G06F 21/6218 |
| | | | 726/28 |
| 2014/0350916 A1* | 11/2014 | Swerdlow | G06F 17/2705 |
| | | | 704/2 |
| 2014/0350964 A1* | 11/2014 | Rhodes | G16H 40/20 |
| | | | 705/3 |
| 2015/0134673 A1* | 5/2015 | Golan | G06F 17/30058 |
| | | | 707/748 |
| 2016/0150281 A1* | 5/2016 | Whaley | H04N 21/4788 |
| | | | 715/719 |
| 2017/0078621 A1* | 3/2017 | Sahay | G06F 17/2229 |
| 2017/0140051 A1* | 5/2017 | Ball | H04L 51/32 |

OTHER PUBLICATIONS

Filippova et al., "Improved Video Categorization From Text Metadata and User Comments", in Proceedings of the the 34th International ACM Sigir Conference on Research and Development in Information Retrieval, Jul. 24-28, 2011, Beijing, CN, pp. 835-842.
International Search Report and Written Opinion dated Mar. 3, 2017 in International Patent Application No. PCT/US2016/065389.
The Official YouTube Blog, "New Captions Feature for Videos", last updated Aug. 28, 2008, pp. 1-18, avaiable at: http://youtube-global.blogspot.nl/20008/08/new-captions-feature-for-videos.html.
Wikipedia, "Language Identification", last updated Feb. 28, 2016, pp. 1-3, available at: https://en.wikipedia.org/w/index.php?title=Language_indentification&oldid=707310151.
Abney et al., "The Human Language Project: Building a Universal Corpus of the World's Languages", in the Proceedings of the 48th Annual Meeting of the Association for Computational Linguistics, Uppsala, SE, Jul. 11-16,2010, pp. 88-97.
Breiman, Leo, "Random Forests", in Machine Learning, vol. 45, No. 1, Oct. 2001, pp. 1-33.
Cortes et al., "Support-Vector Networks", in Machine Learning, vol. 20, issue 3, Sep. 1995, pp. 273-297.
Dietterich, Thomas, "Approximate Statistical Tests for Comparing Supervised Classifcation Learning Algorithms", in Neural Computation, vol. 10, issue 7, Oct. 1998, pp. 1895-1923.
Fan et al., "LIBLINEAR: A Library for Large Linear Classifcation", in the Journal of Machine Learning Research, vol. 9, Jun. 2008, pp. 1871-1874.
Gonzalez-Dominguez et al., "A Real-Time End-to-End Multilingual Speech Recognition Architecture", in IEEE Journal of Selected Topics in Signal Processing, vol. 9, No. 4, Jun. 2015, pp. 749-759.
Google, "Detecting Languages", Technical Paper, last accessed May 15, 2017, pp. 1-3.
Imseng et al., "Hierarchical Multilayer Perceptron Based Language Identification", in the Proceedings of Interspeech, Makuhari, JP, Sep. 26-30, 2010, pp. 1-4.
Ling et al., "Microblogs as Parallel Corpora", in the Proceedings of the 51st Annual Meeting of the Association for Computational Lingustics, Sofia, BG Aug. 4-9, 2013, pp. 176-186.
Littlestone, Nick, "Learning Quickly When Irrelevant Attributes Abound: A New Linear-Threshold Algorithm", in Machine Learning 2, vol. 4, Apr. 1988, pp. 285-318.
Malouf, Robert, "A Comparison of Algorithms for Maximum Entropy Parameter Estimation", in the Proceedings of the 6th Conference on Natural Language Learning, Stroudsburg, PA, US, May 15, 2002, pp. 1-9.
Niesler et al., "Language Identification and Multilingual Speech Recognition Using Discriminatively Trained Acoustic Models", in the Proceedings of Multilingual Speech and Language Processing, Stellenbosch, ZA, Apr. 9-11, 2006, pp. 1-6.
Wang et al., "Shifted-Delta MLP Features for Spoken Language Recognition", in IEEE Signal Processing Letters, vol. 20, No. 1, Jan. 2013, pp. 15-18.

\* cited by examiner

METHODS, SYSTEMS, AND MEDIA FOR LANGUAGE IDENTIFICATION OF A MEDIA CONTENT ITEM BASED ON COMMENTS

CROSS-REFERENCE TO RELATED APPLICATIONS

This application claims the benefit of U.S. Provisional Patent Application No. 62/322,685, filed Apr. 14, 2016, which is hereby incorporated by reference herein in its entirety.

TECHNICAL FIELD

The disclosed subject matter relates to methods, systems, and media for language identification of a media content item based on comments.

BACKGROUND

Many users access video content from services having large collections of video content items. Frequently, these collections include video content that has been uploaded by users from various countries and that contains audio content and/or text content in a variety of languages. As such, video content may be served to users that are unlikely to comprehend the content. For some video content, it may be important for these services to present users with video content that contain audio and/or text content in a language that the user can comprehend.

These services, however, often rely on information that may or may not correctly identify a language used in the video content, such as information in metadata or information provided by a user that uploaded the video content. Moreover, in many instances, the language associated with the video content has not been indicated by the user that uploaded the video content. Techniques, such as automatic speech recognition (ASR), may sometimes be used to determine a language of the video content. Such recognition techniques, however, are not supported for all languages and have problems with background music, noise and multiparty conversations, etc. in the video content. Thus, it is difficult to identify the language of video content.

Accordingly, it is desirable to provide new methods, systems, and media for language identification of a media content item based on comments.

SUMMARY

In accordance with some implementations of the disclosed subject matter, mechanisms for language identification of a media content item based on comments are provided.

In accordance with some implementations of the disclosed subject matter, a method for language identification of media content is provided, the method comprising: obtaining a plurality of comments associated with a media content item; selecting a subset of the plurality of comments based on one or more criteria; assigning, for each comment in the subset of the plurality of comments, a vector of language probabilities, wherein each component of the vector is assigned a language probability that indicates the likelihood that the comment includes content in a language from a plurality of languages; combining the vector of language probabilities for each comment in the subset of the plurality of comments to generate a combined language vector; identifying a language associated with the media content item based on the combined language vector; and performing an action based on the identified language.

In some embodiments, selecting the subset of the plurality of comments based on one or more criteria includes removing comments that do not meet a predetermined number of words or a predetermined number of characters.

In some embodiments, the method further comprises determining a length of each comment in the subset of the plurality of comments, wherein the combined language vector is a weighted average of the language probabilities for each of the plurality of languages and across the subset of the plurality of comments that is weighted based on the determined length of each comment.

In some embodiments, the method further comprises determining a voting indication associated with each comment in the subset of the plurality of comments, wherein the combined language vector is a weighted average of the language probabilities for each of the plurality of languages and across the subset of the plurality of comments that is weighted based on the determined voting indication.

In some embodiments, determining a language associated with the media content item based on the combined language vector further comprises augmenting the combined language vector with an additional vector of language probabilities corresponding to metadata associated with the media content item.

In some embodiments, determining a language associated with the media content item based on the combined language vector further comprises augmenting the combined language vector with media content item information. In some embodiments, the media content item information includes a category of the media content item.

In some embodiments, performing the action further comprises presenting one or more related media content items in the identified language in response to presenting the media content item.

In some embodiments, performing the action further comprises: transmitting information corresponding to the identified language to an advertisement server; receiving, from the advertisement server, an advertisement that corresponds to the identified language; and causing the advertisement to be presented.

In some embodiments, performing the action further comprises: determining that a second media content item to be presented has a language identifier that is different than the identified language; and presenting subtitle information during the presentation of the second media content item, wherein the subtitle information is in the identified language.

In accordance with some implementations of the disclosed subject matter, a system for language identification of media content is provided, the system comprising a hardware processor that is configured to: obtain a plurality of comments associated with a media content item; select a subset of the plurality of comments based on one or more criteria; assign, for each comment in the subset of the plurality of comments, a vector of language probabilities, wherein each component of the vector is assigned a language probability that indicates the likelihood that the comment includes content in a language from a plurality of languages; combine the vector of language probabilities for each comment in the subset of the plurality of comments to generate a combined language vector; identify a language associated with the media content item based on the combined language vector; and perform an action based on the identified language.

In accordance with some implementations of the disclosed subject matter, a non-transitory computer-readable medium containing computer executable instructions that, when executed by a processor, cause the processor to perform a method for language identification of media content is provided, the method comprising: obtaining a plurality of comments associated with a media content item; selecting a subset of the plurality of comments based on one or more criteria; assigning, for each comment in the subset of the plurality of comments, a vector of language probabilities, wherein each component of the vector is assigned a language probability that indicates the likelihood that the comment includes content in a language from a plurality of languages; combining the vector of language probabilities for each comment in the subset of the plurality of comments to generate a combined language vector; identifying a language associated with the media content item based on the combined language vector; and performing an action based on the identified language.

In accordance with some implementations of the disclosed subject matter, a system for language identification of media content is provided, the system comprising: means for obtaining a plurality of comments associated with a media content item; means for selecting a subset of the plurality of comments based on one or more criteria; means for assigning, for each comment in the subset of the plurality of comments, a vector of language probabilities, wherein each component of the vector is assigned a language probability that indicates the likelihood that the comment includes content in a language from a plurality of languages; means for combining the vector of language probabilities for each comment in the subset of the plurality of comments to generate a combined language vector; means for identifying a language associated with the media content item based on the combined language vector; and means for performing an action based on the identified language.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
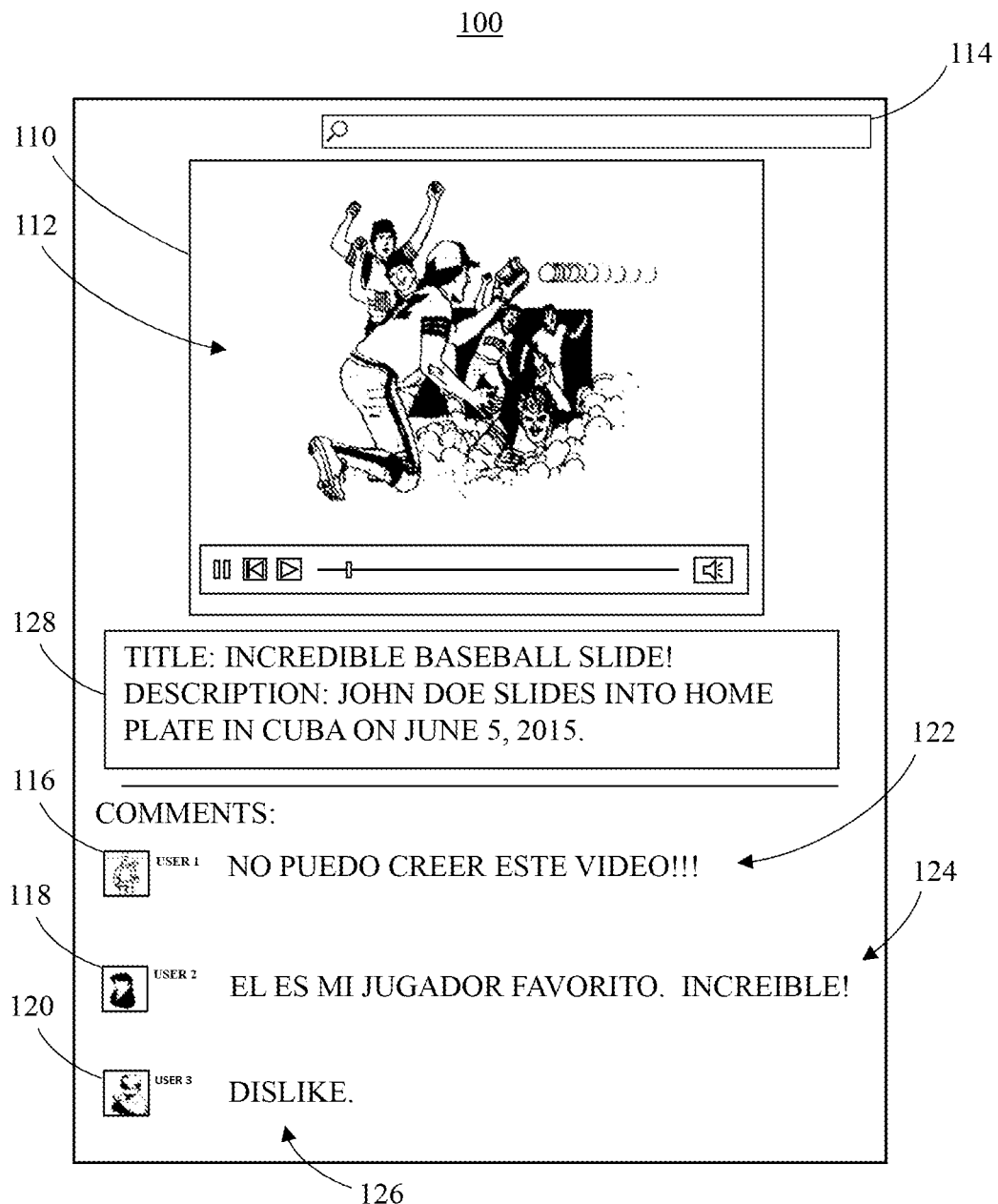
FIG. 1 shows an illustrative example of a user interface for presenting video content and comments associated with the presented video content in accordance with some embodiments of the disclosed subject matter.

In accordance with various embodiments of the disclosed subject matter, mechanisms (which can include methods, systems, and media) for language identification of a media content item based on comments are provided.

In some embodiments of the disclosed subject matter, the mechanisms described herein can retrieve comments that are associated with a media content item. These comments can be ranked and/or filtered in any suitable manner (e.g., by length, by popularity, by user engagement, by any other suitable manner, or any suitable combination thereof). For example, this can include filtering out comments that are less than five words or less than twenty characters in length (e.g., to remove short non-meaningful comments), filtering out automatically-generated comments (e.g., a "Shared on this Service" comment), filtering out comments that are longer than ten thousand characters in length (e.g., to remove machine-generated comments), and/or filtering out comments that include URLs and no text content.

It should be noted that the retrieved comments can include comments that are publicly accessible. It should also be noted that a comment can, in some instances, be deleted such that the comment is no longer associated with the media content item. The language identification mechanisms described herein can retrieve an updated set of comments (e.g., from a comments database associated with a media service) such that deleted comments are excluded from consideration.

Upon selecting a subset of comments, the mechanisms can generate a vector of probabilities for each of multiple languages for each comments. For each comment in the subset of selected comments, the mechanisms can, for example, generate a vector of probabilities, where each component of the vector is a probability that a given comment is in a particular language (e.g., one component of the vector can include a 0.5 probability score that the comment is in the Spanish language).

In some embodiments, the vectors for each of the comments in the subset of comments can be combined to generate a single vector of probabilities for each of multiple language in the subset of comments. Combining the vectors of language probabilities can include, for example, averaging the language probability scores for a particular language across the vectors for each comment to obtain a language score for a particular language that is placed in the single vector of language scores for the media content item across the subset of comments. It should be noted that, in some embodiments, when combining the vectors of language probabilities, one or more weights can be applied to the language probability scores in each vector. For example, when combining the vectors of probabilities for each of the comments, a weight can be applied that takes into account the length of the comment. In a more particular example, when determining a weighted average language score for the set of comments, the weight of the scores for each comment can be proportional to the length of the comment. As such, weights can be used to emphasize that longer comments can bear more weight on determining the language of the media content item.

In response to generating a combined vector of language probabilities for the subset of comments associated with a media content item, the mechanisms can determine a language to associate with the media content item. This can, for example, include selecting the language associated with the maximum score in the combined vector language probabilities after averaging across all of the comments in the subset of comments.

For example, a music video can be uploaded to a social media platform, a video provision service, or any other suitable service by a user that speaks English, and consequently has a title and/or other inputted metadata that is also in English, but contains audio content and text content that is in Spanish. In response to generating a vector of language probabilities for each comment associated with the music video, combining the vectors for each of the comments to generate a single vector across the comments, and determining which component of the single vector has the highest score (e.g., the component that corresponds to the Spanish language), these mechanisms can set a language identifier of the music video to the Spanish language.

It should be noted that, in some embodiments, the language information derived from the comments associated with the media content item can be augmented or supplemented with additional information (e.g., description metadata, title metadata, upvotes associated with the media content item, user information, etc.) to determine the language associated with the media content item.

In some embodiments, upon associating a language identifier with the media content item (e.g., that the music video contains content that is in the Spanish language), the mechanisms can perform additional actions using the determined language identifier. For example, the mechanisms can present recommendation interfaces that include additional media content items that also have the same language identifier (e.g., other music videos having the Spanish language identifier). In another example, the mechanisms can present search results that are responsive to a search query, where the search results have the same language identifier (e.g., video content having the Spanish language identifier). In yet another example, the mechanisms can transmit the language identifier to other sources to obtain additional content, such as advertising content (e.g., advertisements that are in Spanish). In a further example, the mechanisms can be used to provide subtitle information or other supplemental information in the determined language (e.g., Spanish subtitles for video content that is not in Spanish).

In some embodiments, upon performing the comment-based language identification on multiple media content items (e.g., each of the videos in a video database), the mechanisms can use the language identifier associated with each of the media content items along with information relating to the user to present media content recommendations to the user associated with the user account. For example, in response to receiving an indication that the user of a media application prefers media content in a particular language (e.g., from a language preference indicator), the mechanisms can use the language identifier associated with each of the media content items to recommend and/or promote media content having a language identifier that matches the language preference indicator of the user. In another example, the mechanisms can determine information about the user (e.g., that the user speaks Spanish). Such information about the user can be determined by, for example, detecting that a user has accessed a media service using a user account and, in response to receiving affirmative consent to review user account information, access user account information (e.g., user language preferences). In response to determining this information about the user, the mechanisms can recommend particular media content items to the user. For example, in response to determining that the user has entered search terms into a media searching interface, the mechanisms can obtain the search results that are responsive to the search terms and re-rank the search results using the associated language identifiers. In continuing this example, search results having language identifiers that correspond to the information about the user (e.g., videos with Spanish language identifiers for a user that speaks Spanish) can be promoted to the top of a list of recommended media content items.

It should be noted that, although the mechanisms described herein generally relate to language identification of a video content item based on comments that have been provided in relation to that video content item, the mechanisms can be used to identify a language of the content in any suitable type of media content, such as audio content (e.g., music, radio programs, audiobooks, and/or any other suitable type of audio content), television programs, movies, live streaming media content, electronic books, and/or any other suitable type of media content.

Turning to FIG. 1, an example 100 of a user interface for presenting a media content item and comments is illustrated in accordance with some embodiments of the disclosed subject matter. As illustrated, in some embodiments, user interface 100 can include a video display element 110, a video content item 112, a search element 114, comments 122, 124, and 126 which are associated with user representation identifiers 116, 118, and 120, and one or more pieces of metadata 128.

Video display element 110 can be any suitable video display element. In some embodiments, video display element can be configured to display any suitable video format, such as FLASH, AVI, MP4, and/or any other suitable video format. In some embodiments, video display element 110 can present video content item 112 in a video player window which can include any suitable controls, such as a pause control, a volume control, rewind and/or fast-forward controls, and/or any other suitable controls.

Additionally or alternatively, in some embodiments, user interface 100 can be configured to include any suitable type of media player. For example, user interface 100 can include a media player suitable for playing audio files, image files, any other suitable media content items, and/or any suitable combination thereof.

Video content item 112 can be any suitable video content item. In some embodiments, video content item 112 can include verbal content and/or textual content in any suitable language. For example, video content item 112 can be a video that includes verbal content and/or textual content in English. In another example, video content item 112 can be a video that includes content in multiple languages, such as verbal content in Spanish and textual content in English. It should be noted that, in some embodiments, video content item 112 may include no verbal content and/or no textual content (such as silent videos).

Comments 122, 124, and 126 can be any suitable comments. For example, comments can include text, audio data, video data, and/or image data that provides an opinion of, or otherwise remarks upon, the contents of a media content item or a portion of a media content item. In a more particular example, as shown in FIG. 1, each of the comments 122, 124, and 126 can include textual content posted by a user in connection with media content item 112 or a portion of media content item 112. In another more particular example, the comments can include one or more posts written and submitted by a user associated with a social media platform that is visible by one or more users having an established relationship with the user via the social media platform. In such an example, the post on a social media platform can include commentary that references or includes media content item 112. In yet another more particular example, the comments can be aggregated or otherwise obtained from multiple sources, such as comments relating to media content item 112 that are received from users via commenting functionality associated with a browsing application installed on a client device, comments relating to media content item 112 that are received from users associated with a social media platform or any other suitable sharing service, etc.

In some embodiments, each of comments 122, 124, and 126 can be associated with a particular user account. For example, as illustrated in FIG. 1, comments 122, 124, and 126 can be associated with user accounts that are identified by representations 116, 118, and 120. In such an example, representations 116, 118, and 120 can be associated with a user account of a social media platform, a user account of a media content platform, a user account of an e-mail server, or a user of any other suitable service. Alternatively, in some embodiments, each of comments 122, 124, 126 can be associated with a non-particular or anonymous user. In some embodiments, each of comments 122, 124, and 126 can be associated with no user accounts.

In a more particular example, a record for each of these comments in a comments database can include a comment identifier that identifies the comment itself, an author identifier that identifies a user account associated with a user or a group of users, a representation of the author that created, modified, and/or posted the comment (e.g., representations 116, 118, and 120 that are each associated with user accounts), a timestamp that indicates the time when the comment was created, the content of the comment, a media content identifier that identifies the media content item or a portion of the media content item relating to the comment, etc. Note that, although three comments are shown in FIG. 1 and are described herein, any suitable number (e.g., one, two, four, ten, and/or any other suitable number) of comments can be included.

It should be noted that, comments, such as comments 122, 124, and 126, can be in any suitable language. For example, as illustrated in FIG. 1, comments 122 and 124 include textual content that is in Spanish while comment 126 includes textual content that is in English. In another example, comments can include textual content that is in multiple languages (e.g., a text post that is written in both English and Spanish). In yet another example, comments can include textual content that is in one language and image data that includes content in another language.

In some embodiments, the mechanisms described herein can determine language probability scores of the comments associated with a media content item and associate the media content item with a language identifier based on the language probability scores of the comments. For example, as illustrated in FIG. 1, the mechanisms can generate a vector of language probabilities for comments 122, 124, and 126, where the Spanish language components of the vectors for comments 122 and 124 have a greater score than the Spanish language component of the vector for comment 126 and the English language component of the vector for comment 126 has a greater score than the English language components of the vectors for comments 122 and 124. In such an example, because the Spanish language component of a single vector that combines the vectors for comments 122, 124, and 126 has the maximum value among the other components of the single vector, the mechanisms can associate media content item 112 with a language identifier that identifies the language of the media content item as the Spanish language. It should be noted that the language information derived from the single vector can also be used with additional indicators (e.g., title metadata, description metadata, user account information, etc.) to determine a language associated with media content item 112.

In continuing with this example, upon associating the media content item with a language identifier that identifies the language of the media content item as the Spanish language, the mechanisms can perform any suitable action, such as present other media content items having the same language identifier (e.g., in response to requesting a recommendation for additional media content items, in response to entering a search query into search element 114 of FIG. 1, etc.), present an advertisement in the same language as the language identifier associated with the media content item (e.g., a video advertisement presented in video display element 110 before, during, or after the presentation of media content item 112), etc.

Figure 2:
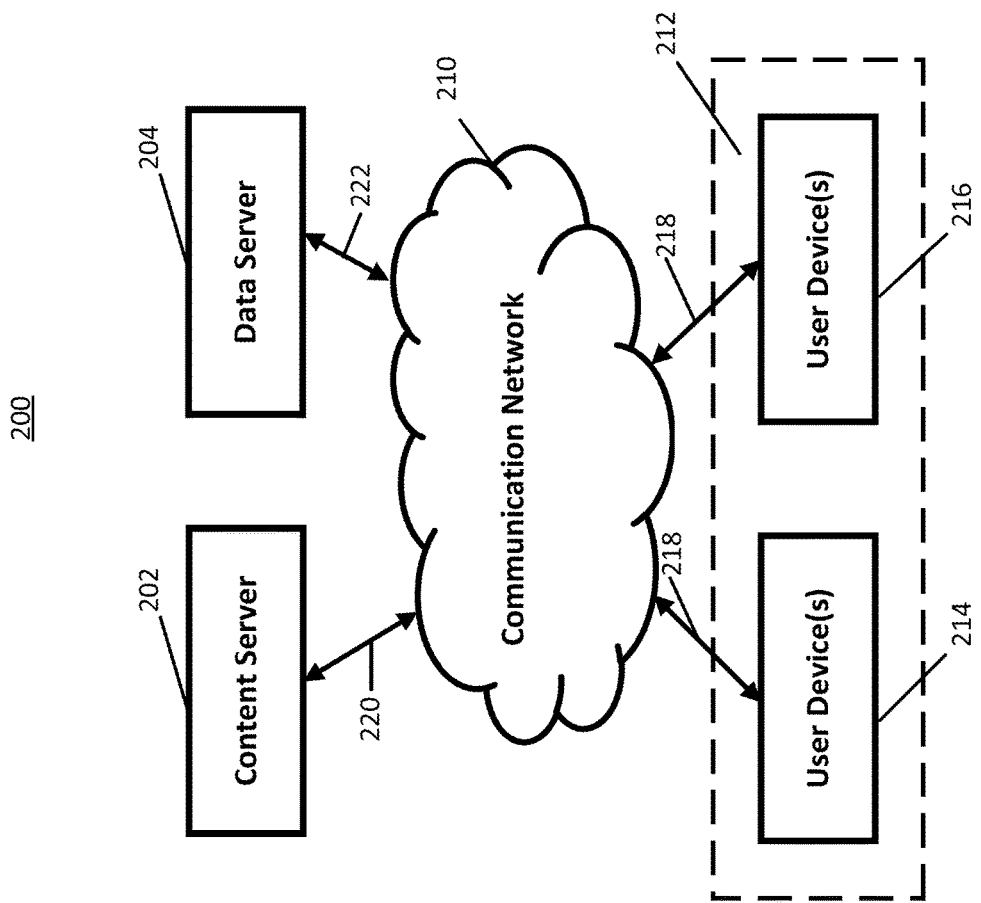
FIG. 2 shows a schematic diagram of an illustrative system suitable for implementation of the mechanisms described herein for language identification of a media content item based on comments in accordance with some embodiments of the disclosed subject matter.

Turning to FIG. 2, an example 200 of hardware that can be used in accordance with some embodiments of the disclosed subject matter for language identification of a media content item based on comments is shown. As illustrated, hardware 200 can include one or more servers, such as a content server 202 and a data server 204, as well as a communication network 210, and/or one or more user devices 212, such as user devices 214 and 216.

In some embodiments, content server 202 can be any suitable server for storing media content and delivering the content to a user device 212. For example, content server 202 can be a server that streams media content to a user device 212 via communication network 210. Media content provided by content server 202 can be any suitable content, such as video content, audio content, electronic books, documents, images, and/or any other suitable type of media content. As a more particular example, media content can include television programs, movies, cartoons, sound effects, streaming live content (e.g., a streaming radio show, a live concert, and/or any other suitable type of streaming live content), and/or any other suitable type of media content. Media content can be created and uploaded to content server 202 by any suitable entity. In some embodiments, content server 202 can be omitted.

In some embodiments, data server 204 can be any suitable server for storing and/or transmitting information related to one or more media content items. As a more particular example, in some embodiments, data server 204 can store and/or transmit metadata that is associated with a media content item. As another more particular example, in some embodiments, data server 204 can include a comments database that stores information related to comments. For example, as described above, a record for a comment in the comments database can include a comment identifier that identifies the comment itself, an author identifier that identifies a user account associated with a user or a group of users, a representation of the author that created, modified, and/or posted the comment, a timestamp that indicates the time when the comment was created, the content of the comment, a media content identifier that identifies the media content item or a portion of the media content item relating to the comment, etc. In some embodiments, data server 204 can be omitted.

Communication network 210 can be any suitable combination of one or more wired and/or wireless networks in some embodiments. For example, communication network 210 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 212 can be connected by one or more communications links 218 to communication network 210 which can be linked via one or more communications links (e.g., communications links 220 and/or 222) to content server 202, application and data server 204, advertisement server 206, and payment server 208. Communications links 218, 220, and/or 222 can be any communications links suitable for communicating data among user devices 212 and servers 202 and/or 204 such as network links, dial-up links, wireless links, hard-wired links, any other suitable communications links, or any suitable combination of such links.

User devices 212 can include any one or more user devices suitable for requesting media content, searching for media content, presenting media content, presenting advertisements, receiving input for playing media content and/or any other suitable functions. For example, in some embodiments, a user device 212 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, a user device 212 can be implemented as a non-mobile device such as a desktop computer, a set-top box, a television, a streaming media player, a game console, and/or any other suitable non-mobile device.

Although content server 202 and data server 204 are illustrated as separate devices, the functions performed by content server 202 and data server 204 can be performed using any suitable number of devices in some embodiments. For example, in some embodiments, the functions performed by either content server 202 or data server 204 can be performed on a single server. As another example, in some embodiments, multiple devices can be used to implement the functions performed by content server 202 and data server 204.

Although two user devices 214 and 216 are shown in FIG. 2 to avoid over-complicating the figure, any suitable number of user devices, and/or any suitable types of user devices, can be used in some embodiments.

Figure 3:
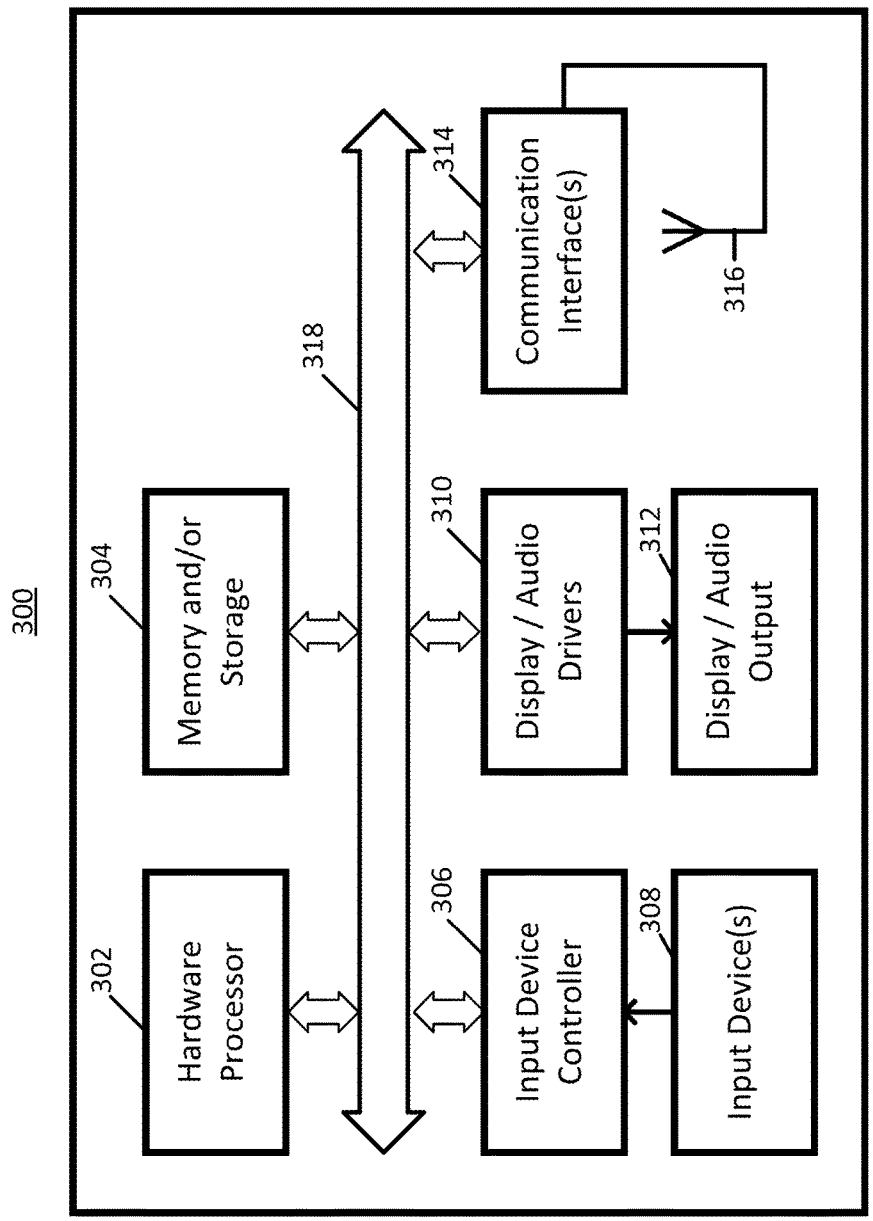
FIG. 3 shows a detailed example of hardware that can be used in a server and/or a user device of FIG. 2 in accordance with some embodiments of the disclosed subject matter.

Content server 202, data server 204, and user devices 212 can be implemented using any suitable hardware in some embodiments. For example, in some embodiments, devices 202, 204, and 212 can be implemented using any suitable general purpose computer or special purpose computer. As another example, a mobile phone may be implemented using a special purpose computer. Any such general purpose computer or special purpose computer can include any suitable hardware. For example, turning to FIG. 3, as illustrated in example hardware 300, such hardware can include hardware processor 302, memory and/or storage 304, an input device controller 306, an input device 308, display/audio drivers 310, display/audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as one of servers 202 or 204). For example, the server program can cause hardware processor 302 to perform the mechanisms described herein for language identification of a media content item based on comments and/or perform any other suitable actions. In some embodiments, hardware processor 302 can be controlled by a computer program stored in memory and/or storage 304 of a user device 212. For example, the computer program can cause hardware processor 302 to present a media content item, request a media content item, and/or perform the mechanisms described herein for language identification of a media content item based on comments.

Memory and/or storage 304 can be any suitable memory and/or storage for storing application information, programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or from any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 210 as shown in FIG. 2. For example, interface(s) 314 can include network interface card circuitry, wireless communication circuitry, and/or any other suitable type of communication network circuitry.

Antenna 316 can be any of one or more suitable antennas for wirelessly communicating with a communication network (e.g., communication network 210) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
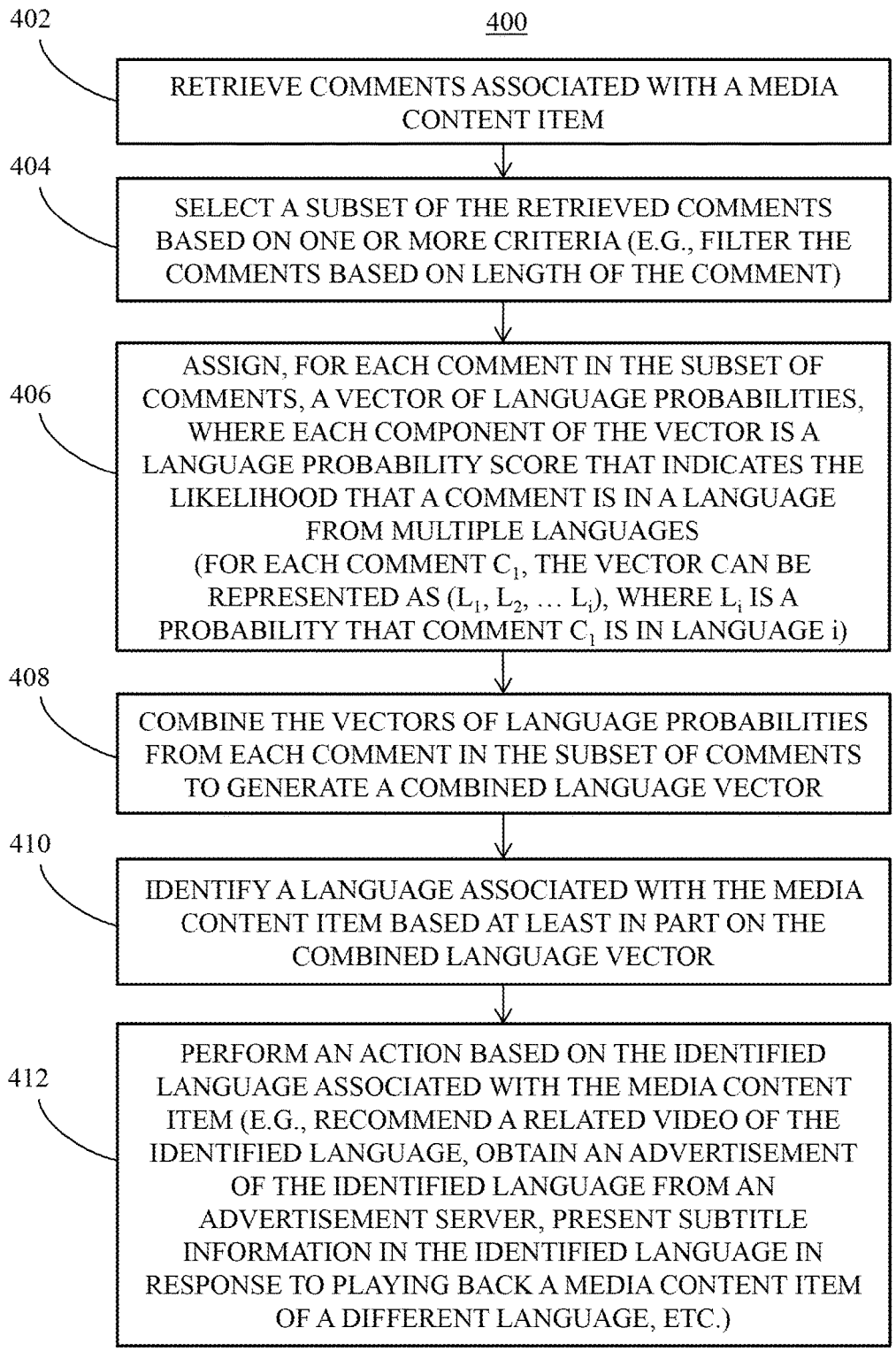
FIG. 4 shows an illustrative example of a process for determining the language of a media content item based on comments in accordance with some embodiments of the disclosed subject matter.

Turning to FIG. 4, an example 400 of a process for language identification of a media content item based on comments is shown in accordance with some embodiments of the disclosed subject matter. In some embodiments, process 400 can be executed by any device or combination of devices. For example, with reference to FIG. 2, process 400 can be executed by content server 202, data server 204, and/or user device 212.

In some embodiments, process 400 can begin at 402 by retrieving comments associated with a media content item using any suitable techniques or combination of techniques. For example, comments that are associated with a media content item (e.g., video 112 in FIG. 1) can be received at a server device (e.g., server device 202, as described above in connection with FIG. 2) when submitted by a user of a user device (e.g., user device 204 as described above in connection with FIG. 2). In such an example, process 400 can access, request, and/or retrieve the comments from the server device. In a more particular example, in response to transmitting a request that includes a media content identifier that identifies the media content item or a portion of the media content item, the server device can access comment and associated comment information from a comments database. The comment information from the comments database can include a comment identifier that identifies the comment, an author identifier that identifies a user account associated with a user or a group of users, a representation of the author that created, modified, and/or posted the comment (e.g., representations 116, 118, and 120 that are each associated with user accounts), a timestamp that indicates the time when the comment was created, the content of the comment, a media content identifier that identifies the media content item or a portion of the media content item relating to the comment, etc. As another example, comments can be included in the metadata associated with the media content item. In such an example, process 400 can access, request, and/or retrieve the comments associated with the media content item concurrently with the metadata associated with the media content item (e.g., the title of the media content item, a description of the media content item, the content creator of the media content item, etc.).

It should be noted that the retrieved comments can include user-generated comments that are publicly accessible. For example, a privacy indicator can indicate that a comment was posted publicly such that the comment is accessible by users not having a particular relationship with the user that provided the comment. It should also be noted that a comment can, in some instances, be deleted such that the comment is no longer associated with the media content item. The language identification mechanisms described herein can transmit a request that retrieves an updated set of comments (e.g., from the comments database) such that deleted comments are excluded from consideration.

It should be noted that the media content item can be a publicly accessible media content item. For example, a privacy indicator can indicate that a video content item was uploaded to a video sharing service in which the video content item is accessible by users not having a particular relationship with the user that uploaded the video content item. In another example, process 400 can determine that the video content item uploaded by the user was not associated with particular access controls (e.g., only viewable by users in a particular social circle, only viewable by a particular user, etc.).

In some embodiments, process 400 can select a subset of comments from the retrieved comments at 404 using any suitable technique or combination of techniques, and using any suitable information or combination of information.

In some embodiments, process 400 can select a subset of comments by filtering out comments based on particular criterion. For example, process 400 can filter out comments from the retrieved set of comments that are less than a particular threshold length—e.g., less than a particular number of words (e.g., five words) or less than a particular number of characters (e.g., twenty characters). In this example, comments like "OK" or "MERCI" can be removed as unlikely to provide a language indicator for the associated media content item, where the comment like "OK" is generally used in many languages and the comment "MERCI" does not necessarily indicate that the commentator is capable of speaking Spanish. As such, filtering by the length of the comment can, for example, remove short and, in some instances, non-meaningful comments from consideration. In a more particular example, referring back to FIG. 1, process 400 can determine that comment 122 contains twenty-four characters, comment 124 contains thirty-two characters, and comment 126 contains seven characters, and, upon applying a threshold value of at least twenty characters, process 400 can filter the comments by removing comment 126 and placing comments 122 and 124 into a subset of selected comments for analysis.

Similarly, process 400 can obtain user-generated comments by filtering out comments from the retrieved set of comments that are greater than a particular threshold length—e.g., greater than ten thousand characters in length. This type of filtering criterion can, for example, remove machine-generated comments that tend to be lengthy. In another example, process 400 can filter out comments that have been deemed abusive or moderated. In yet another example, process 400 can obtain user-generated comments by filtering out automatically-generated comments (e.g., a "Shared on this Service" comment or "Sent by my device" comment). In a further example, process 400 can filter out comments that substantially include or only include URLs and little to no text content.

It should be noted that any suitable filtering criterion or filtering rules for removing comments from consideration can be used.

Additionally or alternatively, in some embodiments, process 400 can select comments for placement in the subset of comments based at least in part on user information associated with each comment. For example, process 400 can select comments based on information contained in a user profile or a user account associated with each comment. In a more particular example, process 400 can select comments from the set of retrieved comments based on the number of other comments made by or associated with the user account, a number of followers associated with the user account that made the comment, whether the user account is verified, whether the user account is a member of a group of users associated with the media content item (e.g., if a media content item has been posted or uploaded by a member of a group and the user account corresponding to the comment is also a member of the group), whether the user account is associated with the source of video (e.g., if a media content item has been posted or uploaded by a user account that is a follower or subscriber of the user account associated with the comment), any other information associated with a user account, and/or any suitable combination thereof.

It should be noted that, prior to retrieving comments associated with a media content item and prior to accessing user account information, these mechanisms can provide a user with an opportunity to provide affirmative consent and/or authorization to access and analyze comment information and user account information, such as receiving user historical information (e.g., browsing history, commenting history, etc.) and/or user preferences. For example, upon loading an application for playing media content on a computing device, such as a mobile device, such an application can prompt the user to provide the consent and/or authorization. In a more particular example, in response to downloading the application for playing media content and loading the application on the computing device, the user can be prompted with a message that requests (or requires) that the user provide consent and/or authorization for the mechanisms to access and/or analyze user account information.

Additionally or alternatively, in some embodiments, process 400 can select comments for placement in the subset of comments based at least in part on popularity information associated with each comment. For example, process 400 can select comments based on the number of upvotes (e.g., thumbs up), likes, and/or any other received indication of approval (e.g., the top ten comments based on number of upvotes). As another example, process 400 can select comments based on the total number of views of each comment (e.g., the top ten comments based on number of views). As yet another example, process 400 can select comments based on the number of sub-comments posted in connection with each comment.

Referring back to FIG. 4, process 400 can continue at 406 by assigning a vector of language probabilities for each comment in the subset of comments. Each vector of language probabilities for each comment can include multiple vector components, where each component includes a probability score that indicates the likelihood that the comment includes content that is in a particular language selected from multiple languages. It should be noted that the number of components can be based at least in part on the number of languages (e.g., five language components, one hundred language components, etc.).

For example, the vector of language probabilities for a comment $C_1$ can be represented as $(L_1, L_2, \ldots, L_i)$, where each $L_i$ is a probability score that comment $C_1$ includes content that is in language i. Such a vector can be generated for each comment in the subset of selected comments.

In a more particular example, process 400 can classify each comment in the subset of comments using a machine language classifier, such as a naïve Bayes classifier, a maximum entropy classifier, a random forest classifier, any other language identification technique, and/or any suitable combination thereof. Using such a machine language classifier, process 400 can analyze each comment and return a probability score for each language that the machine language classifier is trained to detect (e.g., five languages, one hundred languages, etc.).

In connection with FIG. 1, process 400 can, for a subset of ranked comments (e.g., the top N ranked comments based on length and popularity), use a machine learning language classifier to determine a language probability score for each of a set of known languages. For example, process 400 can determine, for comment 122, that the Spanish language probability score is 0.8, that the English language probability score is 0.1, and that the French language probability score is 0.05, and that the Japanese language probability score is 0.05. In such an example, process 500 can generate a language probability vector L of [0.8, 0.1, 0.05, 0.05].

It should be noted that, in response to the machine language classifier failing to identify a language of a comment, process 400 can further filter the subset of comments by removing that comment for language identification and/or use in training dataset. This can, for example, filter out comments that include content in a rare language and/or comments that include non-text content (such as emoticons).

Referring back to FIG. 4, upon obtaining vectors of language probabilities for each of the subset of comments, process 400 can continue at 408 by combining the vectors of language probabilities to generate a single vector for the media content item (e.g., the video shown in FIG. 1). Combining the vectors of language probabilities can include, for example, averaging the language probability scores for a particular language across the vectors for each comment to obtain a language score for a particular language that is placed in the single vector of language scores for the media content item across the subset of comments.

In some embodiments, this combination of vectors can be based on any suitable weight applied to the vector of language probabilities for each comment. For example, if comment $C_1$ is represented as $(L_{11}, L_{12}, \ldots, L_{1n})$ and comment $C_2$ is represented as $(L_{21}, L_{22}, \ldots, L_{2n})$, where n is the number of languages, a weight w can be used to combine the vector for comment $C_1$ and comment $C_2$. This weighted average can be represented as $(w_1/(w_1+w_2))*L_{11}+(w_2/(w_1+w_2))*L_{21}$, $(w_1/(w_1+w_2))*L_{12}+(w_2/(w_1+w_2))*L_{22}$, and so on, where $w_1$ is the weight for comment $C_1$ and $w_2$ is the weight for comment $C_2$. As described herein, the weight can be any suitable weight, such as the length of each comment, the number of upvotes associated with each comment, etc.

In some embodiments, the weight can be based on the length of each comment, such as the number of words in a comment or the number of characters in a comment. In this example, the language probability scores in a vector for longer comments having a greater number of words or a greater number of characters can be weighted higher than the language probability scores in a vector for shorter comments. For example, the length m for each comment can be determined and used to combine the vectors of language probabilities, which can be represented as $(m_1/(m_1+m_2))*L_{11}+(m_2/(m_1+m_2))*L_{21}$, $(m_1/(m_1+m_2))*L_{12}+(m_2/(m_1+m_2))*L_{22}$, and so on, where $m_1$ is the length of comment $C_1$ and $m_2$ is the length of comment $C_2$. In a more particular example, referring back to FIG. 1, in response to determining that comment 122 has a length of five words, comment 124 has a length of six words, and comment 126 has a length of one word in the subset of selected comments associated with media content item 112, the language probability scores in the vector representing comment 124 can be weighted more heavily than the language probability scores in the vector representing comment 122, which can be weighted more heavily than the language probability scores in the vector representing comment 126.

Accordingly, upon weighing the language probability scores for each comment by the length of that comment, process 400 can generate a vector of weighted average language scores across the subset of selected comments for the media content item. That is, when averaging language probability scores, the weight of the language probability scores for each comment is proportional to the length of that comment. This can, for example, generate a vector of sparse continuous features that represent the weighted average scores across the subset of selected comments of the media content item.

In some embodiments, the weight can be based on other information relating to each comment, such as popularity information associated with each comment. Popularity information can include, for example, the number of upvotes (e.g., thumbs up), likes, and/or any other received indication of approval. In this example, the language probability scores in a vector for comments that received a greater number of upvotes can be weighted higher than the language probability scores in a vector for shorter comments. For example, the number of upvotes v for each comment can be determined and used to combine the vectors of language probabilities, which can be represented as $(v_1/(v_1+v_2))*L_{11}+(v_2/(v_1+v_2))*L_{21}$, $(v_1/(v_1+v_2))*L_{12}+(v_2/(v_1+v_2))*L_{22}$, and so on, where $v_1$ is the number of upvotes received for comment $C_1$ and $v_2$ is the number of upvotes received for comment $C_2$.

In some embodiments, additional information relating to each comment can be used to weight the language probability scores in the vector associated with each comment. For example, the language probability scores in the vector for each comment can be weighted based on the total number of views of each comment. In another example, the language probability scores in the vector for each comment can be weighted based on the number of sub-comments posted in connection with each comment.

Process 400 can continue at 410 by determining a language associated with the media content item based at least in part on the combined vector of language probability scores. In some embodiments, process 400 can determine the language associated with the media content item by determining the language in the combined vector of language probability scores has the maximum or highest language probability score. In continuing the example described above in which the language probability scores for each comment are weighted by the length of that comment, process 400 can determine which language in the combined vector received the maximum language score when averaged across the selected subset of comments associated with the media content item.

In a more particular example, process 400 can associate the media content item with a language identifier that identifies the language having the maximum language score in the combined vector of language probability scores.

In some embodiments, prior to determining a language associated with the media content item, process 400 can use the maximum language score, the full language probabilities vector, and/or additional features from the combined vector of language probability scores across the subset of selected comments associated with the media content item along with additional indicators to determine the language of the media content item.

In some embodiments, these additional indicators can include analyzing the metadata associated with the media content item. For example, process 400 can generate a vector for information associated with the media content item, such as the title metadata associated with the media content item and the description metadata associated with the media content item. In a more particular example, text content in the title metadata and the description metadata associated with the media content item can be filtered to remove particular words (e.g., words deemed to be machine-generated, auto-generated, or otherwise non-meaningful) or particular characters (e.g., unidentifiable characters). In turn, the selected portions of the title metadata and/or description metadata can be classified by one of the machine language classifiers described above to return a vector of language probabilities for the title metadata and/or a vector of language probabilities for the description metadata. These additional vectors can be combined or otherwise used in connection with the vectors of language probabilities for the subset of selected comments to determine the language associated with the media content item.

In some embodiments, these additional indicators can also include a category associated with the media content item. For example, process 400 can determine that the media content item is associated with a particular category, such as a NEWS category, a SPORTS category, a MOVIE category, a GAMING category, etc. In response, process 400 can use the category information as an indicator of whether the media content item is likely to include content that is in one language or is likely to include content that is in multiple languages. In this example, this can allow process 400 to predict that a video content item in the MOVIE category is likely to have only one language associated with the video content item, while a video content item in the GAMING category is likely to include audio content that is in multiple languages. This category indicator along with the vectors described above can be used to determine the language associated with the media content item.

In some embodiments, these additional indicators can include information, such as popularity information, relating to the media content item. For example, the total number of comments associated with the media content item (e.g., retrieved from a comments database in response to transmitting a media content identifier) can be used as an additional feature that is augmented with the combined vector of language probability scores for the subset of comments described above. In another example, popularity information, such as the total number of views for the media content item can be used as an additional feature that is augmented with the combined vector of language probability scores for the subset of comments described above.

In some embodiments, these additional information can include statistical information relating to the media content item. For example, the mean and standard deviation of the number of upvotes for the comments associated with the media content item can be used as an additional feature that is augmented with the combined vector of language probability scores for the subset of comments described above. In this example, a high standard deviation of the number of upvotes for the comments associated with the media content item can indicate a lesser confidence in the comments-based language identification in that there are a number of noisy comments that have received little to no upvotes, while a small standard deviation and a high mean of the number of upvotes for the comments associated with the media content item can be used as a confidence indicator for the combined vector of language probability scores. In another example, the mean and standard deviation of the length of the comments associated with the media content item can be used as an additional feature that is augmented with the combined vector of language probability scores for the subset of comments described above. In this example, if the mean length of the comments associated with the media content item is relatively small (thus, encountering only short comments having less than a particular number of words or characters), this can be used as a confidence indicator for the combined vector of language probability scores in that it may be difficult to assign a language to the media content item.

Accordingly, any suitable combination of language-related features and media content-related features can be used to determine the language of a media content item.

Referring back to FIG. 4, process 400 can continue at 412 by performing any suitable action based on the language that has been determined for the media content item, such as recommending a related video or an additional media content item having the same language identifier as the media content item, presenting an advertisement having the same language identifier as the media content item, determining search results responsive to a search query where the search results have the same language identifier as the media content item, any other suitable action, and/or any suitable combination thereof. For example, with reference to FIG. 1, in response to process 400 associating media content item 112 with a Spanish language identifier and in response to determining that a user entered a search query into search element 114, process 400 can present search results that include media content items that are also in Spanish (e.g., media content items associated with a Spanish language identifier). In another example, process 400 can recommend other media content items having the same Spanish language identifier in a user interface (e.g., prior to presenting media content item 112, while media content item 112 is being presented, upon the completion of media content item 112, etc.).

In a more particular example, process 400 can transmit a request to a recommendation engine for additional media content item based on the language identifier associated with the media content item. In response to the request, process 400 can provide the user that is consuming the media content item with related media content items or additional media content items having the same language identifier as the media content item, search results responsive to a search query where the search results have the same language identifier as the media content item, etc.

In another more particular example, process 400 can transmit a request to an advertisement server or any other suitable source for advertising content based on the language identifier associated with the media content item. In response to the request, process 400 can present the user that is consuming the media content item or other media content items with an advertisement that is associated with the same language as the media content item. Such an advertisement can be present before, during, or after the presentation of the media content item. In connection with FIG. 1, in response to process 400 associating media content item 112 with a Spanish language identifier, process 400 can retrieve and present an advertisement that is also in Spanish or has a Spanish language identifier in video display element 110 upon the completion of playing back media content item 112.

In yet another more particular example, process 400 can use the language identifier to set the language of the media player to correspond to the determined language. In response, the media player can determine that a media content item is not in the determined language (e.g., has a language identifier corresponding to a different language) and can present subtitle information corresponding to the determined language while the media content item is being played back.

In some embodiments, process 400 can perform the comment-based language identification described above on multiple media content items, such as each video in a video database. As a result, some or all of the videos in a database can each be associated with a language identifier or an indication of the language of the content in the media content item.

In some embodiments, the language identifier associated with each of the media content items can be used along with information relating to the user to present media content recommendations to the user. For example, in response to receiving an indication that the user of a media application prefers media content in a particular language (e.g., from a language preference indicator), the language identifier associated with each of the media content items can be used to recommend and/or promote media content having a language identifier that matches the language preference indicator of the user. In another example, information about the user can be determined (e.g., that the user speaks Spanish). Such information about the user can be determined by, for example, detecting that a user has accessed a media service using a user account and, in response to receiving affirmative consent to review user account information, access user account information (e.g., user language preferences). In yet another example, information about the user can be predicted from user behavior information (e.g., media content items that the user has accessed, search terms that the user has inputted, etc.). In response to receiving and/or determining this information about the user, particular media content items can be recommended to the user. For example, in response to determining that the user has entered search terms into a media searching interface, search results including media content items that are responsive to the search terms can be obtained and re-ranked using the associated language identifiers. In continuing this example, search results having language identifiers that correspond to the information about the user (e.g., videos with Spanish language identifiers for a user that speaks Spanish) can be promoted to the top of a list of recommended media content items.

It should be noted that, prior to accessing user account information or any other information relating to the user, process 400 can provide the user with an opportunity to provide affirmative consent or authorization to perform actions, such as accessing a user profile or obtaining user language preferences. For example, upon loading a media playback application on a user device, the media playback application can prompt the user to provide authorization for accessing language preference information associated with a user account authenticated on the user device. In a more particular example, in response to downloading the media playback application and/or loading the media playback application on the user device, the user can be prompted with a message that requests (or requires) that the user provide consent prior to performing these actions. Additionally or alternatively, in response to installing the media playback application, the user can be prompted with a permission message that requests (or requires) that the user provide consent prior to performing these actions.

In some embodiments, at least some of the above described blocks of the processes of FIG. 4 can be executed or performed in any order or sequence not limited to the order and sequence shown in and described in connection with the figures. Also, some of the above blocks of FIG. 4 can be executed or performed substantially simultaneously where appropriate or in parallel to reduce latency and processing times. Additionally or alternatively, some of the above described blocks of the processes of FIG. 4 can be omitted.

Although the embodiments disclosed herein have concerned the presentation of video content, it should be understood that the mechanisms described herein can be applied to video-only content, audio-only content, content with a combination of video and audio elements, three-dimensional content, and/or any other suitable media content.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (e.g., hard disks, floppy disks, and/or any other suitable magnetic media), optical media (e.g., compact discs, digital video discs, Blu-ray discs, and/or any other suitable optical media), semiconductor media (e.g., flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for language identification of a media content item based on comments are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for language identification of media content, the method comprising:
   obtaining a plurality of comments associated with a media content item;
   selecting a subset of the plurality of comments based on one or more criteria;
   assigning, for each comment in the subset of the plurality of comments, a representation of language probabilities, wherein each component of the representation is assigned a language probability that indicates the likelihood that the comment includes content in a language from a plurality of languages;
   combining the representation of language probabilities for each comment in the subset of the plurality of comments to generate a combined language representation;
   identifying a language associated with the media content item based on the combined language representation; and
   performing an action based on the identified language that includes determining that a second media content item to be presented has a language identifier that is different than the identified language and presenting subtitle information during the presentation of the second media content item, wherein the subtitle information is in the identified language.

2. The method of claim 1, wherein selecting the subset of the plurality of comments based on one or more criteria includes removing comments that do not meet a predetermined number of words or a predetermined number of characters.

3. The method of claim 1, further comprising determining a length of each comment in the subset of the plurality of comments, wherein the combined language representation is a weighted average of the language probabilities for each of the plurality of languages and across the subset of the plurality of comments that is weighted based on the determined length of each comment.

4. The method of claim 1, further comprising determining a voting indication associated with each comment in the subset of the plurality of comments, wherein the combined language representation is a weighted average of the language probabilities for each of the plurality of languages and across the subset of the plurality of comments that is weighted based on the determined voting indication.

5. The method of claim 1, wherein identifying the language associated with the media content item based on the combined language representation further comprises augmenting the combined language representation with an additional representation of language probabilities corresponding to metadata associated with the media content item.

6. The method of claim 1, wherein identifying the language associated with the media content item based on the combined language representation further comprises augmenting the combined language representation with media content item information.

7. The method of claim 6, wherein the media content item information includes a category of the media content item.

8. The method of claim 1, wherein performing the action further comprises presenting one or more related media content items in the identified language in response to presenting the media content item.

9. The method of claim 1, wherein performing the action further comprises:
   transmitting information corresponding to the identified language to an advertisement server;
   receiving, from the advertisement server, an advertisement that corresponds to the identified language; and
   causing the advertisement to be presented.

10. A system for language identification of media content, the system comprising:
    a hardware processor that is configured to:
    obtain a plurality of comments associated with a media content item;
    select a subset of the plurality of comments based on one or more criteria;
    assign, for each comment in the subset of the plurality of comments, a representation of language probabilities, wherein each component of the representation is assigned a language probability that indicates the likelihood that the comment includes content in a language from a plurality of languages;
    combine the representation of language probabilities for each comment in the subset of the plurality of comments to generate a combined language representation;
    identify a language associated with the media content item based on the combined language representation; and
    perform an action based on the identified language that includes determining that a second media content item to be presented has a language identifier that is different than the identified language and presenting subtitle information during the presentation of the second media content item, wherein the subtitle information is in the identified language.

11. The system of claim 10, wherein selecting the subset of the plurality of comments based on one or more criteria includes removing comments that do not meet a predetermined number of words or a predetermined number of characters.

12. The system of claim 10, wherein the hardware processor is further configured to determine a length of each comment in the subset of the plurality of comments, wherein the combined language representation is a weighted average of the language probabilities for each of the plurality of languages and across the subset of the plurality of comments that is weighted based on the determined length of each comment.

13. The system of claim 10, wherein the hardware processor is further configured to determine a voting indication associated with each comment in the subset of the plurality of comments, wherein the combined language representation is a weighted average of the language probabilities for each of the plurality of languages and across the subset of the plurality of comments that is weighted based on the determined voting indication.

14. The system of claim 10, wherein identifying the language associated with the media content item based on the combined language representation further comprises augmenting the combined language representation with an additional representation of language probabilities corresponding to metadata associated with the media content item.

15. The system of claim 10, wherein identifying the language associated with the media content item based on the combined language representation further comprises augmenting the combined language representation with media content item information.

16. The system of claim 15, wherein the media content item information includes a category of the media content item.

17. The system of claim 10, wherein performing the action further comprises presenting one or more related media content items in the identified language in response to presenting the media content item.

18. The system of claim 10, wherein performing the action further comprises:
   transmitting information corresponding to the identified language to an advertisement server;
   receiving, from the advertisement server, an advertisement that corresponds to the identified language; and
   causing the advertisement to be presented.

19. A non-transitory computer-readable medium containing computer executable instructions that, when executed by a processor, cause the processor to perform a method for language identification of media content, the method comprising:
   obtaining a plurality of comments associated with a media content item;
   selecting a subset of the plurality of comments based on one or more criteria;
   assigning, for each comment in the subset of the plurality of comments, a representation of language probabilities, wherein each component of the representation is assigned a language probability that indicates the likelihood that the comment includes content in a language from a plurality of languages;
   combining the representation of language probabilities for each comment in the subset of the plurality of comments to generate a combined language representation;
   identifying a language associated with the media content item based on the combined language representation; and
   performing an action based on the identified language that includes determining that a second media content item to be presented has a language identifier that is different than the identified language and presenting subtitle information during the presentation of the second media content item, wherein the subtitle information is in the identified language.

* * * * *